US012752293B2

(12) United States Patent
Zavarella et al.

(10) Patent No.: US 12,752,293 B2
(45) Date of Patent: Oct. 6, 2026

(54) DISPENSING HEAD AND DISPENSER

(71) Applicant: APTAR DORTMUND GMBH, Dortmund (DE)

(72) Inventors: Marco Zavarella, Sulmona (IT); Boerje Hegenberg, Dortmund (DE)

(73) Assignee: APTAR DORTMUND GMBH, Dortmund (DE)

(*) Notice: Subject to any disclaimer, the term of this patent is extended or adjusted under 35 U.S.C. 154(b) by 174 days.

(21) Appl. No.: 18/640,270

(22) Filed: Apr. 19, 2024

(65) Prior Publication Data

US 2024/0399402 A1 Dec. 5, 2024

(30) Foreign Application Priority Data

Apr. 19, 2023 (DE) ..................... 10 2023 109 835.7

(51) Int. Cl.
*B05B 11/10* (2023.01)
*A47K 5/12* (2006.01)

(52) U.S. Cl.
CPC ........ *B05B 11/1059* (2023.01); *A47K 5/1211* (2013.01); *B05B 11/1016* (2023.01); *B05B 11/1047* (2023.01); *B05B 11/1074* (2023.01); *B05B 11/1077* (2023.01)

(58) Field of Classification Search
CPC ............. B05B 11/1059; B05B 11/1047; B05B 11/1074; B05B 11/1077; B05B 11/1016; A47K 5/1211
See application file for complete search history.

(56) References Cited

U.S. PATENT DOCUMENTS 3,276,641 A * 10/1966 Lehmann ............. B67D 7/0211 222/384
3,325,054 A * 6/1967 Braun .................. B65D 83/226 251/95
3,848,778 A * 11/1974 Meshberg ........... B65D 83/145 222/402.11
3,933,283 A * 1/1976 Hoagland .............. B65D 83/20 222/402.21
4,324,351 A 4/1982 Meshberg
4,438,871 A 3/1984 Eckert
(Continued)

FOREIGN PATENT DOCUMENTS

DE 2752563 A1 3/1979
DE 3121075 A1 12/1982
(Continued)

OTHER PUBLICATIONS

U.S. Appl. No. 19/106,468, filed Feb. 25, 2025, Jasper et al.

*Primary Examiner* — Frederick C Nicolas
(74) *Attorney, Agent, or Firm* — Jason H. Vick; Amped IP LLC

(57) ABSTRACT

A dispensing head for a dispenser for dispensing a fluid, wherein the dispensing head has an actuator for actuating the dispensing head and/or the dispenser and a fastening part for fastening the dispensing head to a container of the dispenser. The dispensing head has also includes a display device for indicating a first-time use. According to a further aspect, the actuator is rotatable between a first rotational position and a second rotational position and the dispensing head has a blocking device for blocking an actuation of the actuator in the first rotational position.

20 Claims, 6 Drawing Sheets

(56) References Cited

U.S. PATENT DOCUMENTS

| | | | | |
|---|---|---|---|---|
| 4,454,966 | A * | 6/1984 | Hicks | F41H 9/10 222/173 |
| 4,773,567 | A * | 9/1988 | Stoody | B05B 11/1059 222/402.11 |
| 4,796,770 | A | 1/1989 | Begley | |
| 5,085,347 | A * | 2/1992 | Hayes | B65D 47/2012 222/402.1 |
| 5,379,924 | A * | 1/1995 | Taylor | B65D 83/20 222/548 |
| 5,497,915 | A * | 3/1996 | Wass | B05B 11/1015 222/153.07 |
| 5,518,147 | A * | 5/1996 | Peterson | B05B 11/1097 222/153.07 |
| 5,664,703 | A | 9/1997 | Reifenberger et al. | |
| 6,105,826 | A | 8/2000 | Oursin et al. | |
| 6,196,423 | B1 * | 3/2001 | Erxleben | B05B 11/0027 222/153.1 |
| 6,461,322 | B1 | 10/2002 | Ritsche | |
| 6,932,244 | B2 * | 8/2005 | Meshberg | B05B 11/0032 222/548 |
| 6,971,552 | B2 * | 12/2005 | Meshberg | B65D 83/40 222/402.11 |
| 7,367,476 | B2 | 5/2008 | Law et al. | |
| 9,789,502 | B2 * | 10/2017 | Maddy | B05B 15/30 |
| 10,202,224 | B2 | 2/2019 | Painchaud | |
| 10,220,989 | B2 | 3/2019 | Painchaud et al. | |
| 10,752,412 | B1 * | 8/2020 | Hawry | B05B 11/1047 |
| 11,700,928 | B2 * | 7/2023 | Zheng | B05B 11/1046 222/153.09 |
| 2002/0066751 | A1 * | 6/2002 | Meshberg | B05B 15/30 222/153.13 |
| 2003/0010793 | A1 * | 1/2003 | Ritsche | B05B 11/1059 222/153.1 |
| 2003/0150876 | A1 | 8/2003 | Walters et al. | |
| 2004/0262251 | A1 | 12/2004 | Tauber | |
| 2010/0308081 | A1 * | 12/2010 | Waitz | B05B 11/1059 220/315 |
| 2018/0178233 | A1 | 6/2018 | Goettke | |
| 2021/0139211 | A1 | 5/2021 | Painchaud | |
| 2023/0131158 | A1 | 4/2023 | Bodet et al. | |
| 2024/0001387 | A1 | 1/2024 | Barenhoff et al. | |
| 2024/0083664 | A1 | 3/2024 | Pittevils et al. | |

FOREIGN PATENT DOCUMENTS

| | | | |
|---|---|---|---|
| DE | 69700430 | T2 | 5/2000 |
| DE | 19942791 | A1 | 3/2001 |
| DE | 112023000061 | T5 | 8/2024 |
| EP | 4008442 | A1 | 6/2022 |
| WO | WO 2021/185981 | A1 | 9/2021 |
| WO | WO 2022/250534 | A1 | 12/2022 |
| WO | WO 2024/062031 | A1 | 3/2024 |

* cited by examiner

DISPENSING HEAD AND DISPENSER

CROSS-REFERENCE TO RELATED APPLICATIONS

This application claims the benefit under 35 U.S.C. 119 (a) to German Patent Application No. 10 2023 109 835.7, filed 19 Apr. 2023, the entirety of which is incorporated herein by reference.

BACKGROUND

The present invention relates to a dispensing head for a dispenser for dispensing a fluid.

The fluid is preferably a cleaning product or a cosmetic product, for example a bath or glass cleaner, a shower gel, a shampoo, a cream, a perfume or the like.

It is known from the prior art to provide a packaging or a container for a product, in particular in the food and cosmetics sector, with a tamper-evident seal. A tamper-evident seal is in particular a device by means of which a user or consumer can detect that the packaging or the container is still originally packaged or closed and has not yet been opened. For example, such a tamper-evident seal can be formed by a sticker which is attached in such a way that the sticker is damaged or destroyed when the packaging or the container is opened (for the first time). Furthermore, plastic rings which have to be removed or destroyed before they are opened (for the first time) are also known as tamper-evident seals.

The tamper-evident seals known from the prior art are unaesthetic, unhygienic, susceptible to error and/or require an additional step before the product is used for the first time, in which step the tamper-evident seal has to be removed or destroyed and/or in which parts have to be disposed of separately, with the result that the use of the product is cumbersome or uncomfortable for the user.

Furthermore, dispensing heads for dispensers for dispensing a fluid are known from the prior art, which dispensing heads have a rotatable actuator, wherein the actuator is secured against actuation in one rotational position and can be actuated and/or pressed down in another rotational position. Such a function is also referred to as a twist-to-lock function.

A respective dispensing head is described, for example, in US 2003/0150876 A1. In this case, the mechanism for realizing the twist-to-lock function requires a relatively large amount of space and the dispensing head consists of a multiplicity of separate parts. Overall, this leads to high production costs and an expensive assembly of the dispensing head.

SUMMARY

The object underlying the present invention is therefore to specify a dispensing head and/or dispenser in which an initial use can be identified and/or is indicated and/or which can be secured against actuation, wherein the dispensing head and/or dispenser has a simple and/or compact structure; can be produced simply, in a material-saving and/or cost-effective manner and/or can be operated securely and/or comfortably.

The object underlying the invention is solved by a dispensing head as disclosed herein.

The present invention relates to a dispensing head for a dispenser for dispensing a fluid, wherein the dispensing head has a movable actuator for actuating the dispensing head and/or the dispenser and a fastening part for fastening the dispensing head to a container of the dispenser.

The dispensing head preferably has a display device for indicating a first-time use of the dispensing head. This makes it possible for a user to detect whether the dispensing head and/or the dispenser has already been used.

According to a first aspect of the present invention, the dispensing head is designed to automatically move the display device from a first position into a second position before or during a first-time actuation of the actuator. Here, the dispensing head has a locking mechanism which is designed to lock the display device against a return movement from the second position into the first position. This makes it possible to reliably indicate a first-time use or use that has taken place. Furthermore, the automatic movement of the display device before or during an actuation of the actuator automatically indicates a first-time use or use that has taken place, so that an additional step such as a destruction or removal of a safeguard or a tamper-evident seal before the first-time use is dispensed with. The operation of the dispensing head and/or dispenser is therefore more comfortable and simpler for the user. Furthermore, the locking mechanism is less susceptible to error than known tamper-evident seals or safeguards.

According to a further aspect of the present invention, which can also be implemented independently, the display device is designed to indicate a first-time use without damage, destruction or removal of a part of the dispensing head. This is conducive to hygiene and injuries caused by sharp-edged components, which can arise in the event of damage or destruction of parts of the dispensing head, are prevented. Furthermore, no removed parts have to be disposed of separately, which facilitates the recycling of the dispensing head and/or dispenser and makes the operation more comfortable and simpler. Finally, the non-destructive solution according to the proposal is also less susceptible to error than known tamper-evident seals or safeguards.

The actuator is preferably linearly movable and/or rotatable, in particular relative to the fastening part, in particular in order to lock the actuator against actuation or to unlock it for actuation and/or in order to dispense a fluid by means of the actuator.

The first and second position of the display device are preferably different rotational positions of the display device, in particular with respect to a movement axis of the actuator. In other words, the display device is preferably rotatable, in particular about the movement axis of the actuator. The movement axis of the actuator is in particular an axis along which the actuator is linearly movable, in particular in order to convey and/or dispense a fluid, and/or about which the actuator is rotatable, in particular in order to block or enable actuation of the actuator. This solution is particularly reliable and can be realized simply and is secure and comfortable for the user.

The actuator preferably has a dog for moving the display device from the first position into the second position during a (first-time) movement, in particular rotation, of the actuator. This makes it possible to automatically actuate and/or move the display device before or during a first-time use, so that a first-time actuation/use and/or an actuation/use that has taken place is reliably indicated, and saves an additional step such as a destruction or removal of a tamper-evident seal or a safeguard before the dispensing head is used.

The locking mechanism preferably has two locking elements corresponding to one another, in particular a gear and a pawl, for the preferably form-fitting locking of the display device against a return movement into the first position. The blocking elements are preferably moved past one another during the movement of the display device from the first position into the second position. In particular, a (mechanical) return stop or ratchet is thereby implemented. This solution is particularly reliable and can be realized simply. Furthermore, the locking mechanism represents a particularly hygienic solution that is comfortable for the user.

The display device is preferably of annular design and/or is arranged and/or fastened rotatably on the fastening part, in particular an upper edge of the fastening part. This makes it possible to indicate a first-time use or use that has taken place simply, reliably and in a manner that is easily understandable and/or easily identifiable for the user.

The locking mechanism is preferably arranged on an inner side of the dispensing head and/or is invisible from the outside. This is hygienic, is not susceptible to errors and protects against injuries. Furthermore, this is particularly aesthetic since the external appearance of the dispensing head and/or dispenser is not impaired.

According to a further aspect, which can also be implemented independently, the actuator is rotatable between a first rotational position and a second rotational position.

Furthermore, the dispensing head has a blocking device for blocking an actuation of the actuator in the first rotational position and/or outside the second rotational position, wherein the actuator has a cylindrical outer wall and an actuation surface arranged thereon at an end side and the blocking device is arranged radially outside the cylindrical outer wall. This enables a material-saving and cost-effective production and small design of the dispensing head as well as the elimination of additional components.

The blocking device preferably has a blocking surface, in particular arranged on a side of the cylindrical outer wall of the actuator opposite the actuation surface, preferably wherein the blocking surface projects radially outwards from the cylindrical outer wall of the actuator. This arrangement or construction is conducive to a material-saving and compact design.

The blocking device preferably has an, in particular radially inwardly projecting, blocking element arranged on the fastening part, preferably wherein the blocking element has one or more ribs. This is conducive to a material-saving and compact design and enables the elimination of further components.

The blocking surface and the blocking element preferably correspond to one another, wherein in the first rotational position of the actuator the blocking surface and the blocking element are arranged in the same angular position, so that an actuation of the actuator is blocked by the blocking surface and the blocking element, and wherein in the second rotational position of the actuator the blocking surface is arranged outside the blocking element, so that an actuation of the actuator is released. This enables a simple, comfortable and intuitive operation as well as the elimination of further components such as, for example, cover caps for covering the dispensing head and/or actuator.

According to a further aspect, which can also be implemented independently, the present invention relates to a dispenser for dispensing a fluid having a container and a dispensing head fastened thereto, wherein the dispensing head is designed as described herein. The advantages of the dispensing head are correspondingly achieved by the dispenser.

The aforementioned aspects and features as well as further aspects and features resulting from the claims and the following description can be implemented independently of one another and in different combinations.

Further advantages, features, properties and aspects of the present invention result from the claims and the following description of a preferred embodiment with reference to the drawing.

DETAILED DESCRIPTION

Figure 1:
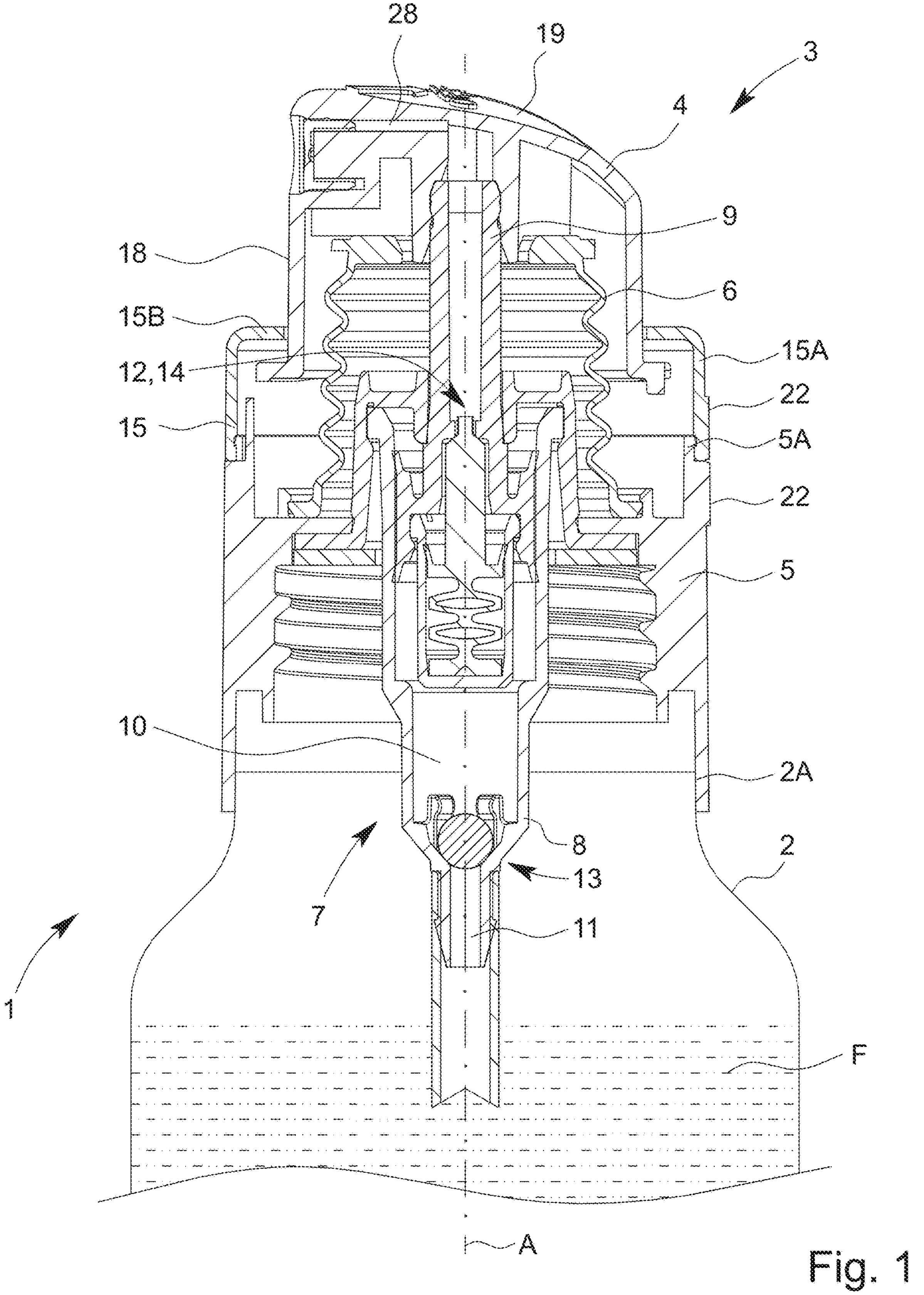
FIG. 1 shows a schematic section of a dispenser with a dispensing head according to the proposal.

In the only schematic figures, which are partially not true to scale, the same reference numerals are used for identical or similar parts, wherein corresponding or comparable properties and advantages can be achieved, even if a repeated description is dispensed with.

FIG. 1 shows a schematic illustration of a dispenser 1. The dispenser 1 has a container 2 for receiving a schematically indicated fluid F and a dispensing head 3 for dispensing the fluid F from the container 2.

The fluid F is preferably a cosmetic product, a medical product, a hygiene product, a cleaning product or the like, for example a deodorant, a perfume, a cream, a lotion, a shaving foam, a shower gel, a shampoo, a hair gel, a hair spray, a bath cleaner, a rinsing agent, a baking oven cleaner or the like.

The fluid F is preferably received in the dispenser 1 and/or the container 2. The fluid F conveyable from the container 2 and/or dispensable from the dispenser 1 and/or to a user (not illustrated) via the dispensing head 3.

The dispensing head 3 preferably has an actuator 4 for actuating the dispensing head 3 and/or the dispenser 1 and a fastening part 5 for fastening the dispensing head 3 to the container 2. The actuator 4 preferably has an outlet channel 28 for dispensing the fluid F.

The dispensing head 3 and/or the actuator 4 is preferably designed for dispensing the fluid F as a liquid, spray, foam, gel, cream or paste.

The fastening part 5 is preferably fastened and/or fastenable to the container 2, in particular an upper edge 2A of the container 2, for example screwable and/or screwed onto the container 2 and/or the edge 2A.

The fastening part 5 may be of multi-part design and/or have or consist of a plurality of parts connected fixedly, in particular rotationally fixedly, to one another.

The dispensing head 3 preferably has no housing part, within which the fastening part 5 is arranged and/or which surrounds or encloses the fastening part 5.

The actuator 4 is movable, in particular relative to the fastening part 5 and/or the container 2. In particular, the actuator 4 is movable relative to a movement axis A. The movement axis A is in particular a central axis of the dispensing head 3 and/or dispenser 1.

Relative terms such as “top”, “bottom” or the like relate in particular to the position of the dispensing head 3 and/or dispenser 1 illustrated in FIG. 1, in which the dispensing head 3 is located above the container 2 and/or the movement axis A is oriented vertically.

Relative terms such as “inside”, “outside” or the like relate in particular to the relative position with respect to the movement axis A.

Terms such as “axial”, “radial” or the like relate in particular to the movement axis A. A radial direction or extent is in particular a direction or extent radial to the movement axis A. An axial movement is in particular a movement along the movement axis A or parallel to the movement axis A.

The actuator 4 is movable linearly along and/or parallel to the movement axis A, in particular can be pressed down in the direction of the container 2 and/or fastening part 5. By pressing down the actuator 4, the fluid F is preferably conveyable from the container 2 and/or dispensable from the dispensing head 3. The term “pressing down” thus refers in particular to a linear movement of the actuator 4 along the movement axis A downward and/or in the direction of the fastening part 5 and/or container 2.

The actuator 4 is preferably rotatable, in particular about the movement axis A and/or between a first rotational position and a second rotational position, in particular thus from the first rotational position into the second rotational position and from the second rotational position into the first rotational position. The actuator 4 is rotatable in particular relative to the fastening part 5 and/or the container 2.

Figure 2A:
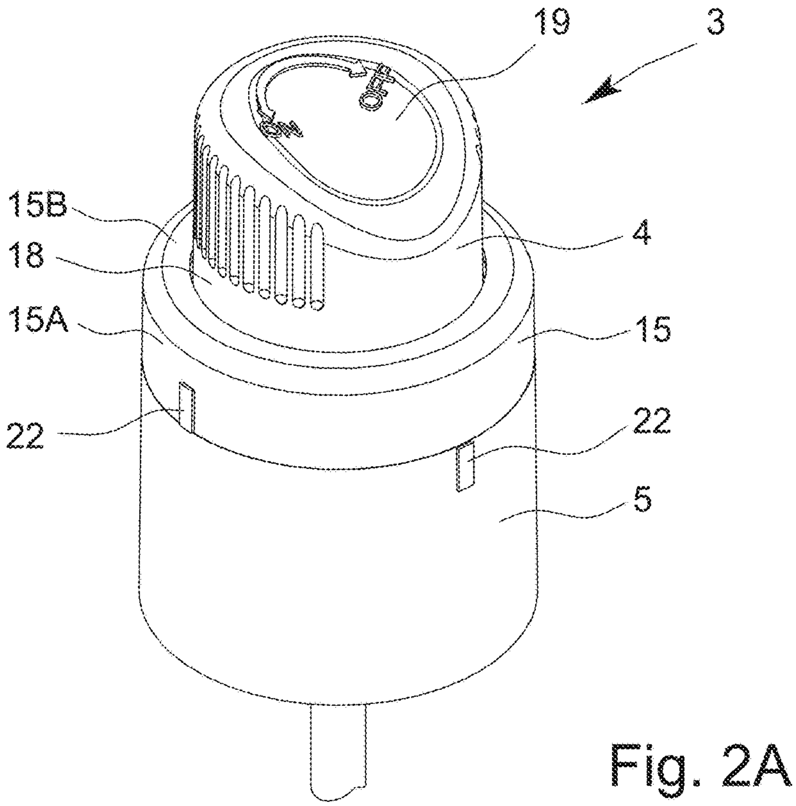
FIG. 2A shows a schematic perspective view of the dispensing head, wherein a display device of the dispensing head is located in a first position.
Figure 2B:
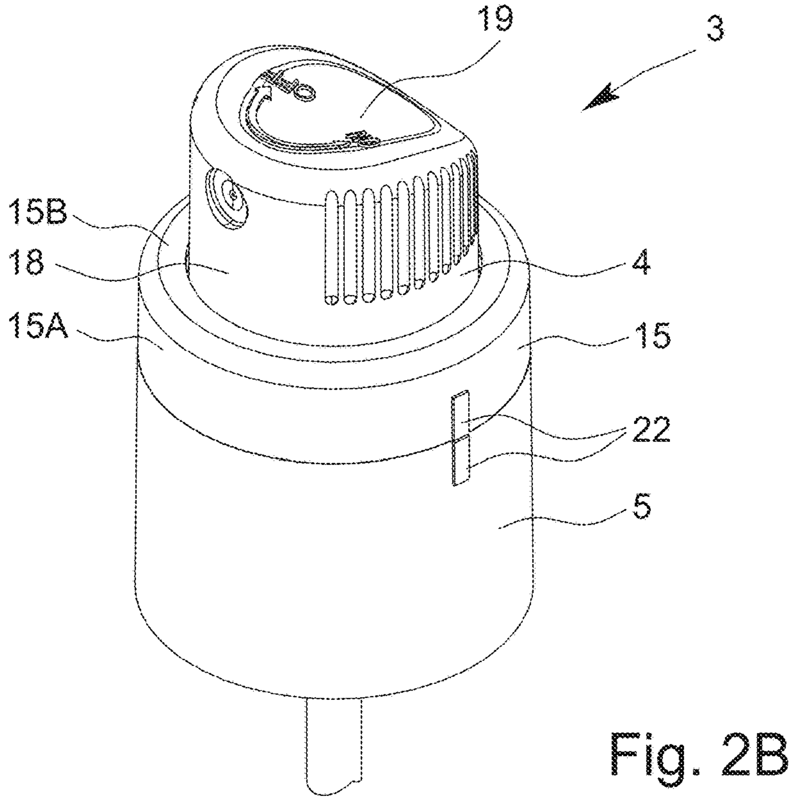
FIG. 2B shows a schematic perspective view of the dispensing head, wherein the display device is located in a second position.
Figure 6A:
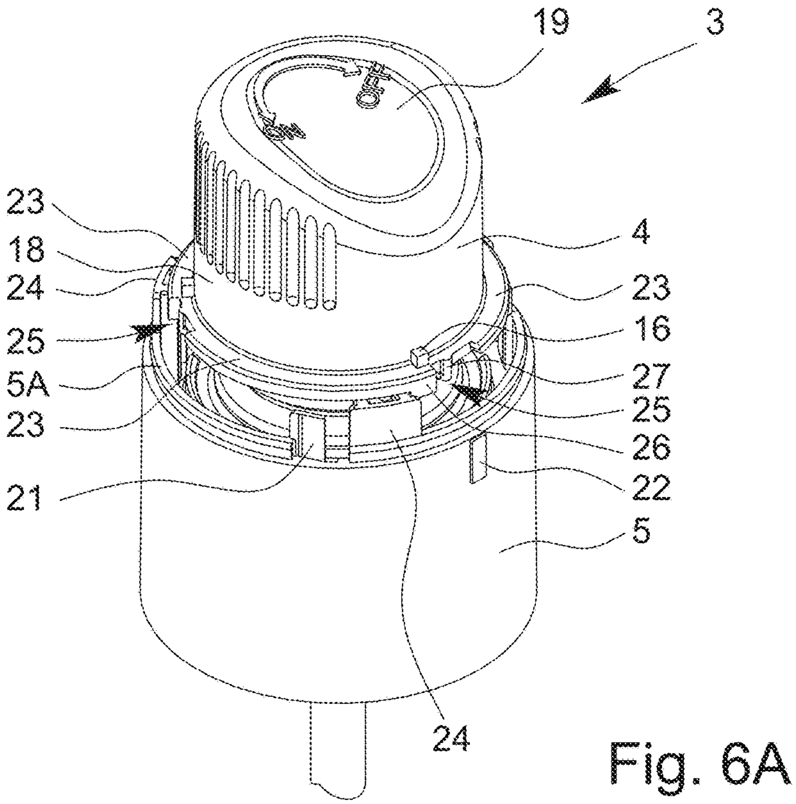
FIG. 6A shows a schematic perspective view of the actuator and the fastening part, wherein the actuator is located in a first rotational position.
Figure 6B:
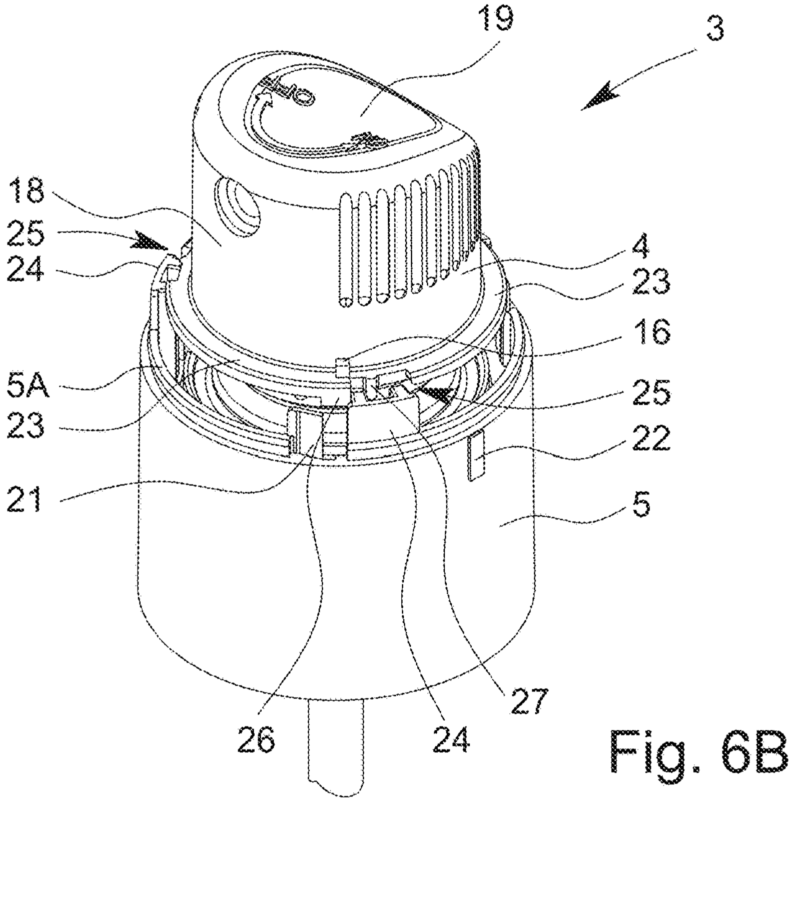
FIG. 6B shows a schematic perspective view of the actuator and the fastening part, wherein the actuator is located in a second rotational position.

The first rotational position of the actuator 4 is illustrated in FIGS. 2A and 6A and the second rotational position of the actuator 4 is illustrated in FIGS. 2B and 6B.

The dispensing head 3 preferably has a return device 6 for automatically returning the actuator 4 into a starting position after pressing down and/or actuating the actuator 4 for dispensing fluid F. The return device 6 is in particular a spring. In the exemplary illustration, the return device 6 and/or spring is designed as a spring bellows and/or folded bellows and preferably consists of plastic.

The return device 6 is preferably arranged in such a way that it does not come into contact with the fluid F.

Preferably, the return device 6 is arranged between the actuator 4 and the fastening part 5 and/or connected to the actuator 4 and/or the fastening part 5.

The dispensing head 3 preferably has a pump 7 for conveying the fluid F, in particular from the container 2. The pump 7 has in particular a pump housing 8, a piston 9, a pump chamber 10, an inlet 11, an outlet 12, an inlet valve 13 and an outlet valve 14.

With the pump 7, a fluid F is conveyable from the container 2 of the dispenser 1 and dispensable via the dispensing head 3. The piston 9 is axially movable in order to convey the fluid F via the inlet 11 into the pump chamber 10 and out of the pump chamber 10 to the outlet 12.

Preferably, the pump 7 and/or the pump housing 8 is fastened to the fastening part 5 and/or held by the fastening part 5.

The return device 6 is preferably arranged outside the pump 7 and/or the pump housing 8 and/or the piston 9.

The actuator 4 is preferably fastened to the piston 9, in particular in such a way that the piston 9 and the actuator 4 move together, in particular when the actuator 4 is actuated and/or pressed down in the direction of the container 2 and/or moved back into the starting position again, in particular by means of the return device 6.

The piston 9 is preferably fluidically connected to the outlet channel 28, so that fluid F to be dispensed can enter the outlet channel 28 from the piston 9 and can be dispensed from the dispensing head 3 and/or the actuator 4 via the outlet channel 28.

The dispensing head 3 preferably has a display device 15. The display device 15 is designed in particular to indicate a first-time use and/or use that has taken place and/or actuation of the dispensing head 3 and/or the dispenser 1 and/or the actuator 4.

In particular, the display device 15 can therefore be used to indicate whether or that use of the dispensing head 3 has already taken place. A user can therefore detect by means of the display device 15 whether the dispensing head 3 and/or the dispenser 1 is new and/or unused or has already been used and/or actuated.

The display device 15 preferably has a first position and a second position which is different from the first position. Preferably, the first and second position of the display device 15 are different rotational positions of the display device 15 and/or the display device 15 is rotatable, in particular about the movement axis A and/or (exclusively and/or once) from the first position or rotational position into the second position or rotational position.

FIG. 2A illustrates the first position of the display device 15 and FIG. 2B illustrates the second position of the display device 15.

The dispensing head 3 is preferably designed to automatically move and/or rotate the display device 15 from the first position into the second position before or during a first-time actuation of the actuator 4, in particular a first-time rotation of the actuator 4 from the first rotational position into the second rotational position.

Furthermore, the dispensing head 3 preferably has a locking mechanism for locking a movement or return movement of the display device 15 from the second position into the first position. In other words, the dispensing head 3 is therefore preferably designed in such a way that the display device 15 can no longer be moved back into the first position or starting position once it has been moved from the first position into the second position.

Figure 3A:
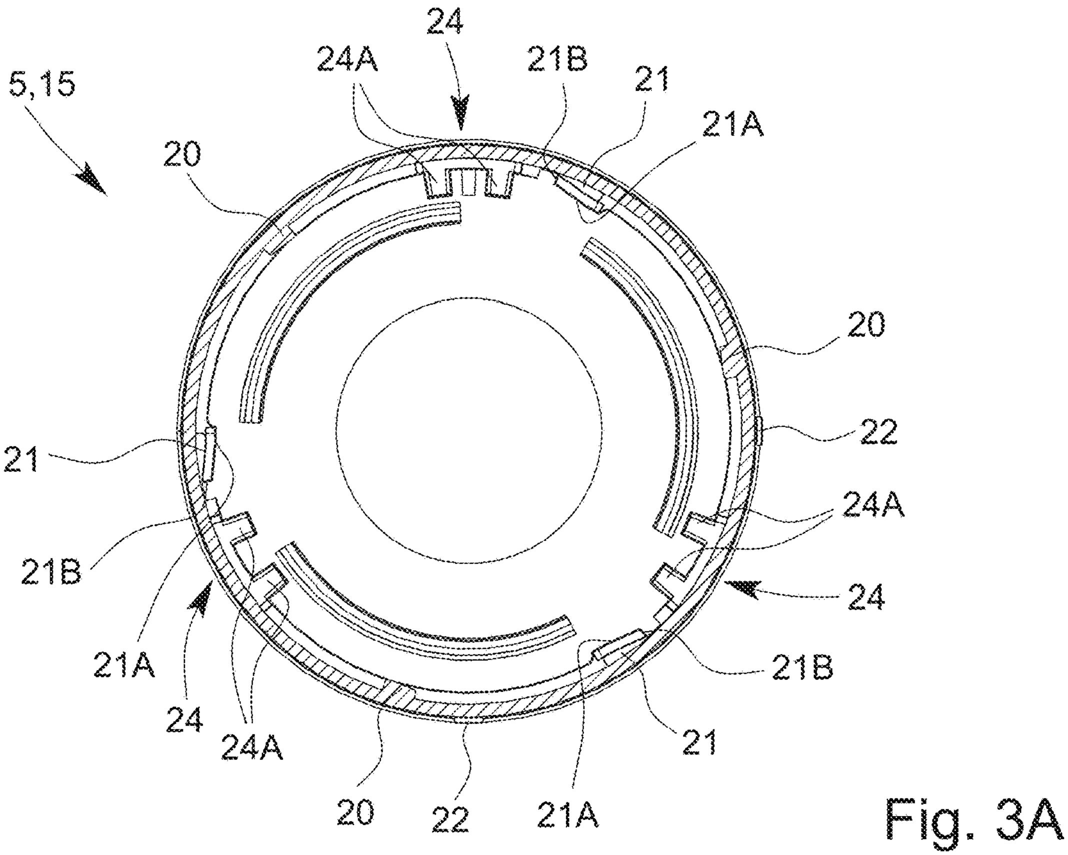
FIG. 3A shows a schematic section of the dispensing head perpendicular to a movement axis of the actuator, wherein the display device is located in the first position.
Figure 3B:
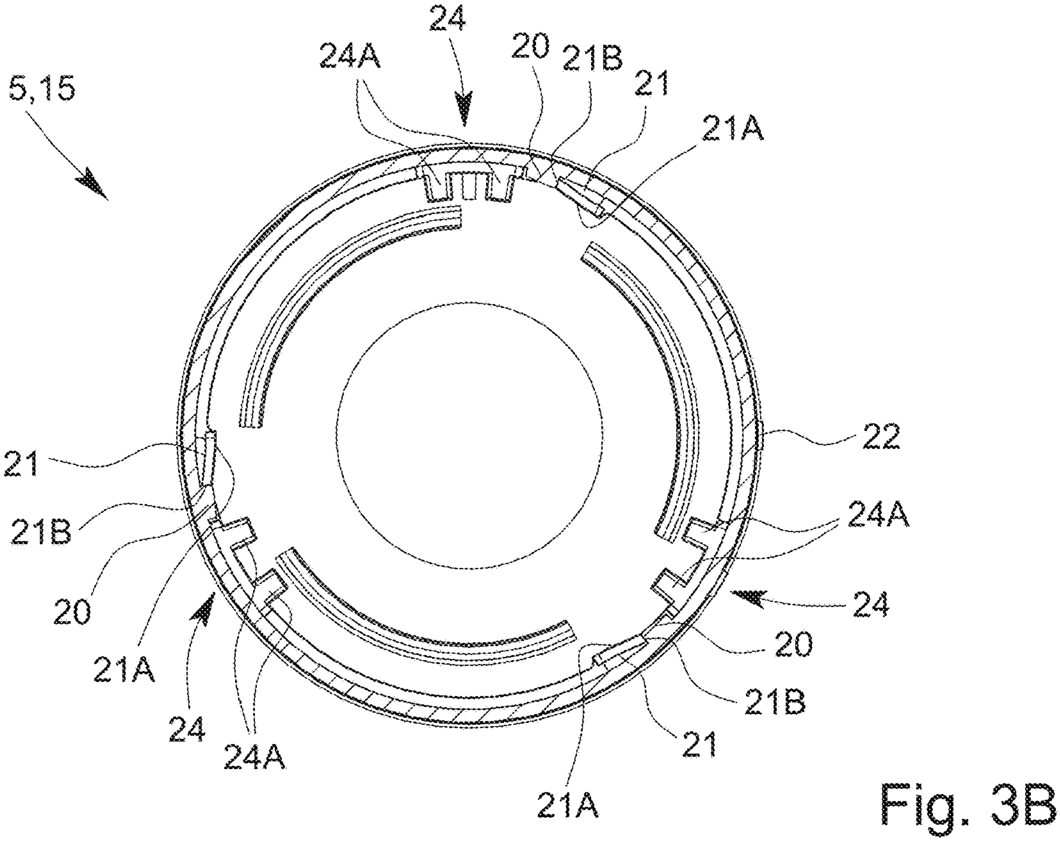
FIG. 3B shows a schematic section of the dispensing head perpendicular to the movement axis of the actuator, wherein the display device is located in the second position.
Figure 4A:
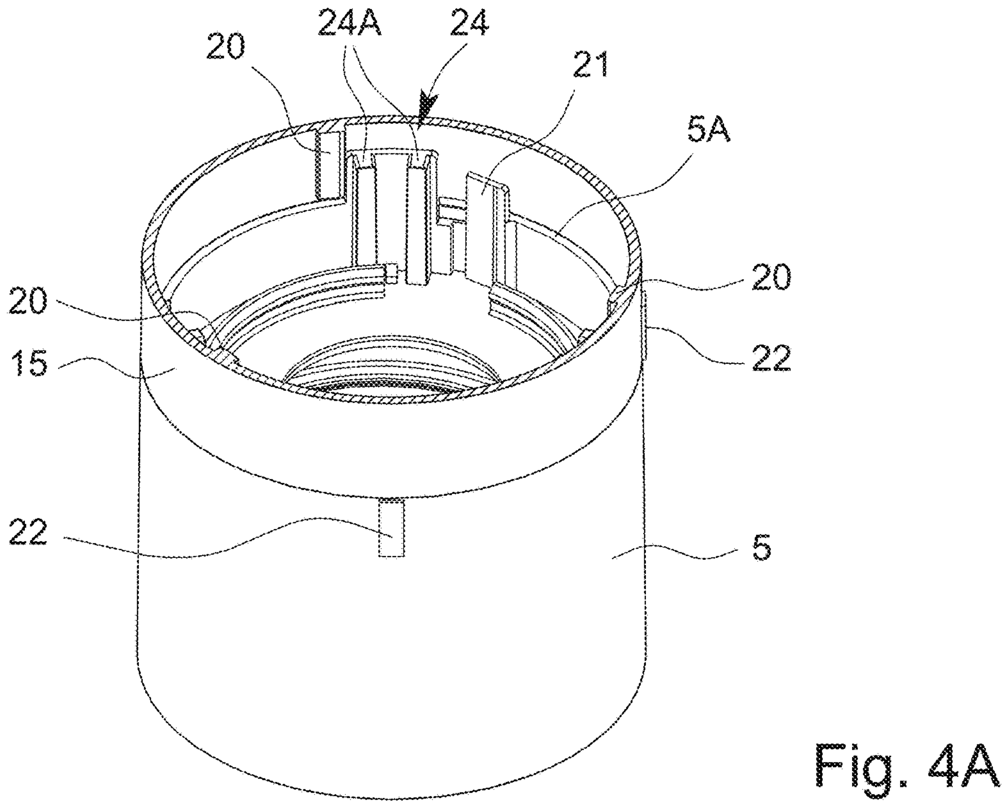
FIG. 4A shows a schematic perspective and partially sectioned view of parts of the dispensing head with the display device in the first position.
Figure 4B:
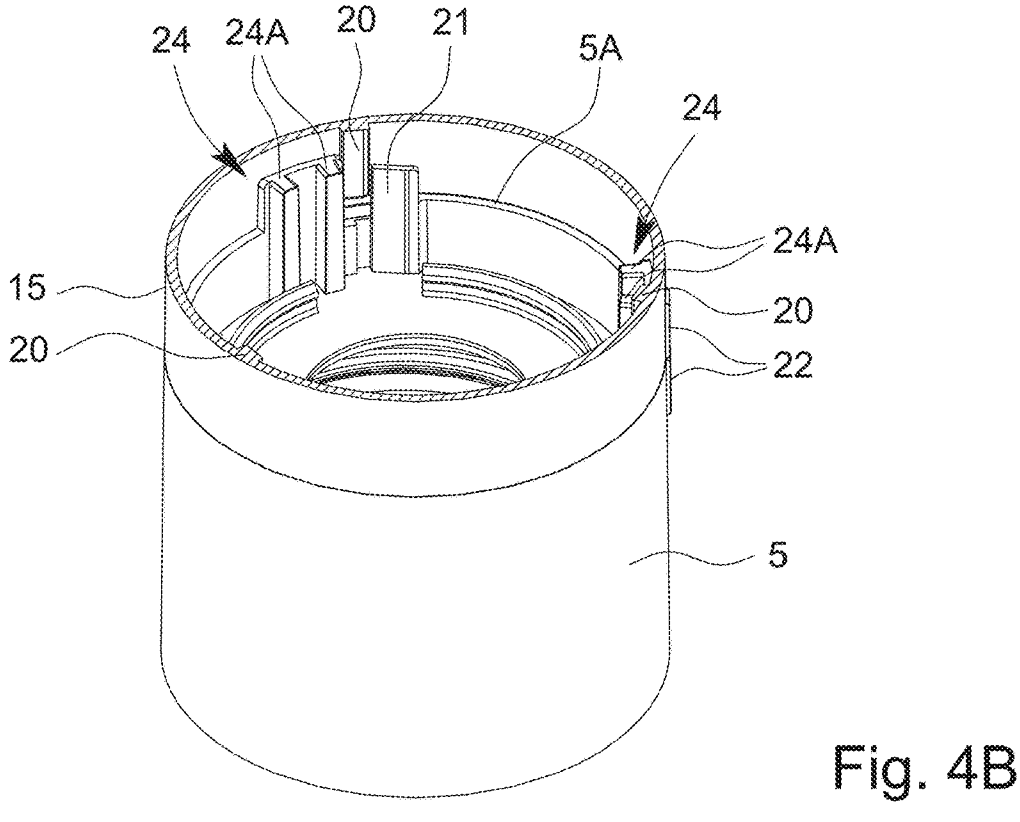
FIG. 4B shows a schematic perspective and partially sectioned view of parts of the dispensing head with the display device in the second position.

The locking mechanism is illustrated in particular in FIGS. 3A, 3B, 4A and 4B, wherein FIGS. 3A and 4A show the display device 15 in the first position and FIGS. 3B and 4B show the display device 15 in the second position. Furthermore, for the sake of clarity, only the fastening part 5 and the display device 15 are illustrated in FIGS. 3A, 3B, 4A and 4B, while the other parts of the dispensing head 3 are omitted.

The indication of a first-time actuation of the actuator 4 and/or the dispensing head 3 by the display device 15 takes place in particular in such a way that no parts of the dispensing head 3 are destroyed and/or damaged and/or have to be removed from the dispensing head 3. The display device 15 is therefore preferably designed for non-destructive indication of a first-time actuation or use of the dispensing head 3.

The display device 15 is preferably fastened and/or arranged on the fastening part 5, in particular on an upper side and/or an upper edge 5A of the fastening part 5. The display device 15 is preferably arranged on a side of the fastening part 5 facing away from the container 2 and/or facing the actuator 4.

The display device 15 is preferably rotatable, in particular about the movement axis A. The first and second position of the display device 15 are preferably different rotational positions of the display device 15, in particular with respect to the movement axis A.

Preferably, an angle of rotation of at least 60°, in particular at least or approximately 90°, lies between the first and second position.

Preferably, the display device 15 is of annular design and/or the display device 15 surrounds or encloses the actuator 4, in particular radially with respect to the movement axis A.

In particular, the display device 15 has a cylindrical portion 15A and a radial portion 15B, in particular arranged at an end side and/or at an end of the cylindrical portion 15A facing away from the container 2. The cylindrical portion 15A and the radial portion 15B are preferably of integral design and/or different portions of the same component.

The actuator 4 preferably has a dog 16 for entraining the display device 15 and/or moving, in particular rotating, the display device 15 from the first position into the second position.

The dog 16 is designed in particular to move the display device 15 from the first position into the second position during a first-time rotation of the actuator 4 from the first rotational position into the second rotational position.

Preferably, the display device 15 has a stop 17, in particular corresponding to the dog 16 and/or assigned to the dog 16.

Figure 5:
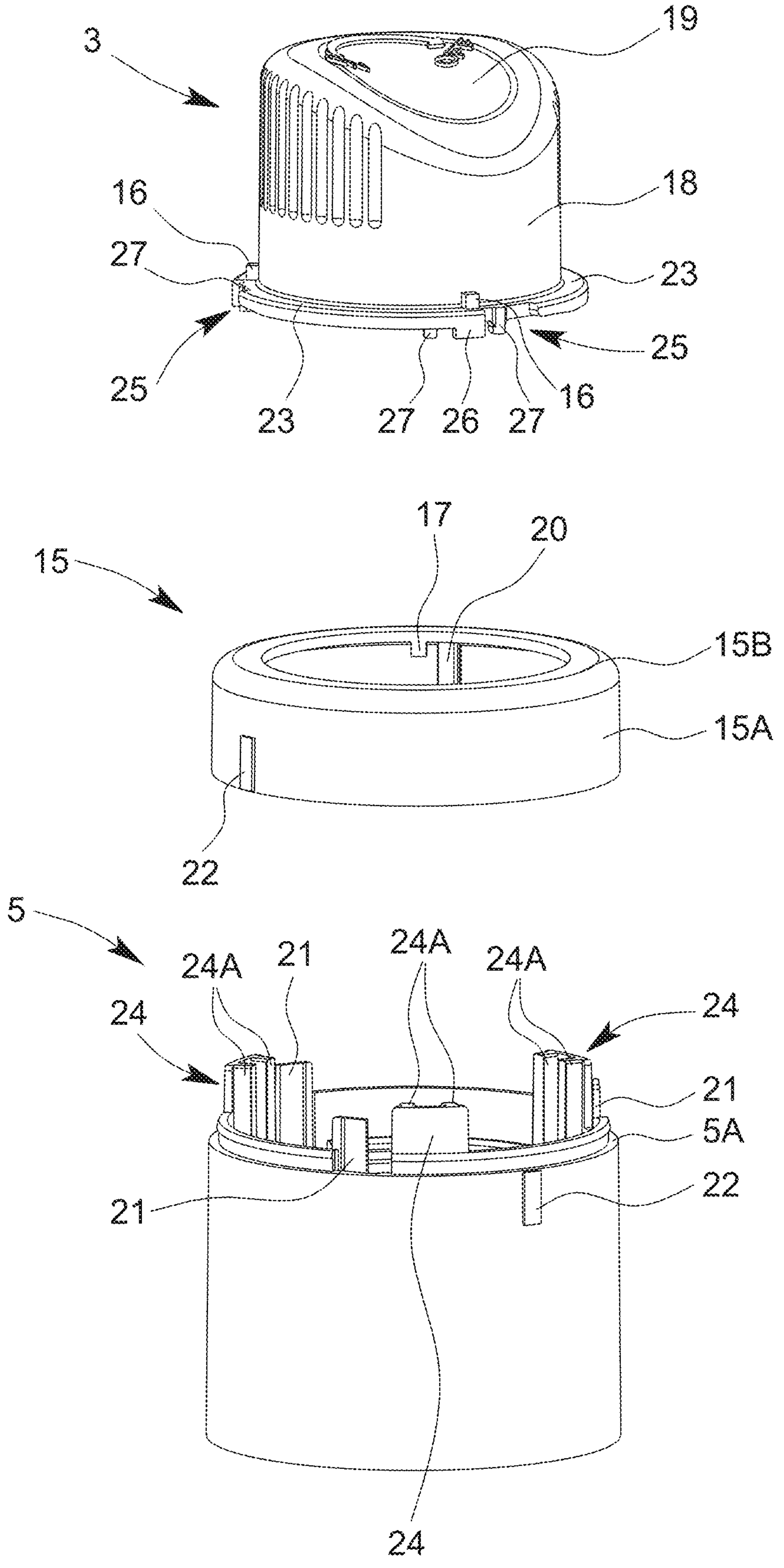
FIG. 5 shows a perspective exploded view of the actuator, the display device and a fastening part of the dispensing head.

The dog 16 and the stop 17 are shown in particular in FIG. 5.

The display device 15 is movable from the first position into the second position by means of the dog 16 and/or the stop 17. In particular, the dispensing head 3 is designed in such a way that the display device 15 is automatically moved from the first position into the second position by means of the dog 16 and/or the stop 17 when the actuator 4 is rotated from the first rotational position into the second rotational position for the first time.

The actuator 4 preferably has a cylindrical outer wall 18. Furthermore, the actuator 4 preferably has an actuation surface 19 arranged at an end side, in particular on a side of the actuator 4 facing away from the fastening part 5 and/or the container 2. The actuation surface 19 is in particular a surface that is designed for a user to exert a pressure on the surface and therefore the actuator in order to press down the actuator 4, in particular for dispensing the fluid F.

The dog 16 is preferably arranged outside and/or on the outside of the outer wall 18. In particular, the dog 16 projects in the radial direction from the outer wall 18.

The stop 17 is preferably arranged on the radial portion 15A of the display device 15, in particular on an inner edge of the radial portion 15A and/or on an underside of the radial portion 15A.

The stop 17 is preferably arranged on the display device 15 in such a way that the dog 16 contacts the stop 17 during a (first-time) actuation of the actuator 4 and/or movement of the actuator 4 from the first into the second rotational position and therefore moves and/or rotates the display device 15 from the first position into the second position.

During a subsequent return movement of the actuator 4 from the second rotational position into the first rotational position, the dog 16 is preferably released from the stop 17, so that no movement or rotation of the display device 15 is induced by the movement of the actuator 4 and/or the display device 15 remains in the second position. Furthermore, the display device 15 is preferably locked against a return movement into the first position by means of the locking mechanism.

The dispensing head 3 may have a plurality of pairs of dogs 16 and stops 17 assigned to one another. In the illustrative example, the dispensing head 3 has three pairs of dogs 16 and stops 17, which are arranged in particular in each case at an angle of rotation of 120° with respect to one another.

The locking mechanism is designed in particular as a ratchet and/or mechanical return stop.

Preferably, the locking mechanism has two locking elements 20, 21 corresponding to one another. In particular, the locking element 20 forms a gear or gear wheel and the locking element 21 forms a pawl or ratchet pawl.

A gear is in particular a part which is or is locked against a movement by means of a pawl. Correspondingly, a pawl is in particular a part which locks a gear against a movement.

The locking mechanism or the locking elements 20, 21 are in particular designed for the form-fitting locking or blocking of a movement of the display device 15 from the second position into the first position.

Preferably, the display device 15 has the locking element 20, in particular therefore the gear or gear wheel, or forms the latter and/or the fastening part 5 or a component connected fixedly or rotationally fixedly to the fastening part 5 and/or the container 2 has the locking element 21, in particular therefore the pawl or the ratchet pawl, or forms the latter.

The locking mechanism or the locking elements 20, 21 is/are preferably arranged invisible and/or concealed for a user and/or arranged on an inner side of the dispensing head 3.

The locking element 20 is preferably arranged on the inside of the display device 15, in particular on the inner side of the cylindrical portion 15A. Preferably, the locking element 20 projects inwardly from the cylindrical portion 15A. In particular, the locking element 20 is designed as an elongate and/or web-like elevation on the inner side of the cylindrical portion 15A. The locking element 20 is preferably of integral design with the display device 15, in particular injection-molded together with the display device 5.

The locking element 21 is preferably arranged on the upper edge 5A of the fastening part 5. The locking element 21 is preferably of integral design with the fastening part 5, in particular injection-molded together with the fastening part 5.

The locking element 21 preferably has a flat flank 21A and a steep flank 21B. The flat flank 21A preferably runs at least substantially tangentially and/or at a small angle, in particular less than 20°, to the tangential. The steep flank 21B preferably runs at least substantially radially and/or at a small angle, in particular less than 20°, to the radial.

Preferably, the locking element 20 is arranged radially outside the locking element 21. The dispensing head 3 is preferably designed in such a way that, during the movement and/or rotation of the display device 15 from the first into the second position, the locking element 20 is moved past the locking element 21, in particular on an outer side, preferably wherein the locking element 20 contacts the locking element 21, in particular its flat flank 21A.

Preferably, the fastening part 5, the display device 15, the locking element 20 and/or the locking element 21 is/are of flexible and elastically deformable design in such a way that the locking element 20 is moveable past the locking element 21, in particular wherein this movement past is made possible by an elastic deformation that is generated by the pressure that the locking elements 20, 21 exert on one another as they move past.

During the movement of the locking element 20 past the locking element 21, the locking element 21 is preferably pressed inwardly and/or elastically deformed and/or the locking element 20 is pressed outwardly and/or elastically deformed.

By means of the locking elements 20, 21, in particular a return movement of the display device 15 from the second into the first position is prevented, in particular by a contact of the locking element 20 with the steep flank 21A of the locking element 21, which prevents and/or blocks a movement of the locking element 20 past the locking element 21, in particular in a form-fitting manner.

Preferably, the locking element 20 contacts the locking element 21 and/or its steep flank 21A in the second position of the display device 15.

The dispensing head 3 may have a plurality of pairs of locking elements 20, 21 assigned to one another. In the illustrative example, the dispensing head 3 has three pairs of locking elements 21, which are arranged in particular in each case offset by approximately 120° with respect to one another about the movement axis A.

Preferably, the dispensing head 3 has a marking 22 for marking the position of the dispensing device 15. In particular, the marking 22 allows a user to identify in which position the display device 15 is located and/or whether a first-time use of the dispensing head 3 has already taken place.

Preferably, the marking 22 is formed by one or more elevations on an outer side of the fastening part 5 and/or of the display device 15. In the illustrative example, the marking 22 is formed by an, in particular dash- or web-like, elevation on the outer side of the fastening part 5 and an elevation (separate therefrom) on the outer side of the display device 15 and/or of the cylindrical portion 15A of the display device 15, in particular wherein the elevations are located in different angular positions with respect to the movement axis A in the first position of the display device 15 and are located in the same angular position with respect to the movement axis A in the second position of the display device 15. As a result, the position of the display device 15 and therefore a use of the dispensing head 3 that has already taken place can be identified and/or read by a user.

However, the marking 22 may also be of different design, for example may be adhesively bonded, printed or impressed onto the fastening part 5 and/or the display device 15 and/or may have one or more symbols, a color coding or the like for indicating the position of the display device and/or a first-time use and/or use that has taken place. Furthermore, it is also possible for the display device 15 or the fastening part 5 to have one or more windows, wherein different markings, symbols and/or colors are indicated in the window and/or are visible through the window in the first and second position of the display device 15.

According to a further aspect, which can also be implemented independently, the dispensing head 3 has a blocking device for blocking an actuation of the actuator 4, in particular an axial movement and/or pressing down of the actuator 4. By means of the blocking device, an actuation and/or pressing down of the actuator 4 is preferably blocked in the first rotational position and/or outside the second rotational position. In the second rotational position of the actuator 4, an actuation and/or pressing down is preferably enabled and/or released.

The blocking device and/or the blocking surface 23 and blocking element 24 thereof explained in more detail below is/are illustrated in particular in FIGS. 2A, 2B, 5, 6A and 6B.

Furthermore, FIGS. 6A and 6B show the actuator 4 and the fastening part 5 for clarification, wherein the actuator 4 is located in the first rotational position in FIG. 6A and in the second rotational position in FIG. 6B.

The blocking device is preferably arranged radially outside the cylindrical outer wall 18 of the actuator 4. Preferably, the blocking device has a plurality of components and/or elements, in particular a blocking surface 23 and/or a blocking element 24, which are each arranged radially outside the cylindrical outer wall 18 of the actuator 4. This enables a particularly space-saving and material-saving design and/or a small design of the dispensing head 3, in particular a small diameter and/or cross section of the dispensing head 3 and/or the actuator 4 perpendicular to the movement axis A.

By arranging the blocking device radially outside the outer wall 18, in particular the diameter (in particular perpendicular to the movement axis A) of the dispensing head 3, the fastening part 5 and/or the actuator 4 and/or the outer wall 18 can be reduced, so that a compact and material-saving design is enabled.

The blocking device preferably consists of elements arranged on the actuator 4 and elements arranged on the fastening part 5, which correspond to one another in such a way that in the first rotational position and/or outside the second rotational position an actuation of the dispensing head 3 and/or pressing down of the actuator 4 is blocked and in the second rotational position an actuation of the dispensing head 3 and/or pressing down of the actuator 4 is released.

Preferably, the blocking device has a blocking surface 23 for the, in particular form-fitting, blocking of an axial movement and/or pressing down of the actuator 4 in the first rotational position and/or outside the second rotational position of the actuator 4. Preferably, the actuator 4 has the blocking surface 23 and/or the blocking surface 23 is arranged on the actuator 4.

Furthermore, the blocking device preferably has a blocking element 24. Preferably, the fastening part 5 has the blocking element 24 and/or the blocking element 24 is arranged on the fastening part 5.

The blocking surface 23 and the blocking element 24 preferably correspond to one another, in particular in such a way that in the first rotational position and/or outside the second rotational position a pressing down of the actuator 4 is blocked by a contact of the blocking element 24 with the blocking surface 23 (in a form-fitting manner) and in the second rotational position a pressing down of the actuator 4 is released and/or enabled.

The blocking surface 23 is preferably arranged on the actuator 4 at an end side and/or opposite the actuation surface 19. In particular, the blocking surface 23 projects radially outwards from the cylindrical outer wall 18.

The blocking element 24 preferably has one or more ribs 24A, in particular of elongate design and/or extending parallel to the movement axis A, or is formed thereby. In particular, the blocking element 24 and/or the ribs 24A is/are arranged on the inside of the fastening part 5 and/or on the upper edge 5A of the fastening part 5. The ribs 24A are preferably of identical design. In the illustrative example, the blocking element 24 has (exactly) two ribs 24A and/or a pair of ribs.

In the first rotational position and/or outside the second rotational position of the actuator 4, the blocking surface 23 and the blocking element 24 are preferably located in the same angular position relative to the movement axis, as illustrated in particular in FIG. 6A. In the second rotational position, the blocking surface 23 is preferably located in a different angular position than the blocking element 24, as illustrated in particular in FIG. 6B. As a result, the pressing down of the actuator 4 is blocked in the first rotational position and/or outside the second rotational position and released in the second rotational position.

Outside the blocking surface 23, the actuator 4 has a smaller radial extent than in the region of the blocking surface 23, so that a free space 25 is formed outside the blocking surface 23, through which free space the blocking element 24 can pass in the second rotational position and/or can be moved past the blocking surface 23. This enables the actuator 4 to be pressed down.

The blocking device may have a plurality of blocking surfaces 23 and blocking elements 24 and/or pairs of ribs, each assigned to one another. In the illustrative example, the blocking device has (exactly) three blocking surfaces 23 and (exactly) three blocking elements 24, which are preferably each formed by a pair of ribs. The blocking surfaces 23 and blocking elements 24 are arranged in each case offset by approximately 120° with respect to one another about the movement axis A in the illustrative example.

A free space 25 is preferably located in each case between the blocking surfaces 23. In the second position of the display device 15, the locking element 20 is preferably arranged between the or a locking element 21 and the or a blocking element 24, in particular clamped and/or secured in a form-fitting manner. The blocking element 24 or the blocking elements 24 preferably block a movement of the display device 15 beyond the second position and/or define the second position of the display device 15 or fix the latter.

In this way, the locking mechanism and the blocking device preferably interact synergistically.

The dispensing head 3, in particular the actuator 4, preferably has one or more stops 26 for limiting a rotation of the actuator 4.

In the illustrative example, the dispensing head 3 has three stops 26, in particular of identical design. The stops 26 are preferably arranged symmetrically and/or in each case offset by approximately 120° with respect to one another about the movement axis A.

In particular, the stops 26 define the first and second rotational positions of the actuator 4 and/or the stops 26 fix the first and second rotational positions of the actuator 4, in particular together with the blocking element 24 or the blocking elements 24. The stops 26 preferably interact with the blocking elements 24. The blocking elements 24, in particular together with the stops 26, are designed to block and/or limit a rotation of the actuator 4.

The stops 26 are preferably arranged on the end of the actuator 4 facing the fastening part 5, in particular on the blocking surface 23. Particularly preferably, the stops 26 project downward and/or in the direction of the fastening part 5 and/or container 2 from the blocking surface 23.

In the first rotational position, a rotation of the actuator 4 starting from the first rotational position in a direction opposite to the second rotational position is preferably blocked by the stops 26, in particular by a contact of the stop 26 with one of the blocking elements 24. From the first rotational position, the actuator 4 is therefore preferably rotatable only in the direction of the second rotational position, while a rotation in the opposite direction is prevented by a stop 26 or the stops 26, in particular by the blocking element 24 or the blocking elements 24 contacting the stop 26 or the stops 26.

In the second rotational position, a rotation of the actuator 4 starting from the second rotational position in a direction opposite to the first rotational position is preferably blocked by the stops 26, in particular by a contact of the stop 26 with one of the blocking elements 24. From the second rotational position, the actuator 4 is therefore preferably rotatable only in the direction of the first rotational position, while a rotation in the opposite direction is prevented by a stop 26 or the stops 26, in particular by the blocking element 24 or the blocking elements 24 contacting a stop 26 or the stops 26.

The or each blocking element 24 is preferably arranged between two stops 26.

The blocking element(s) 24 and the stops 26 are preferably designed and/or arranged in such a way that during the rotation of the actuator 4 from the first rotational position into the second rotational position an angle of rotation of approximately 90° is swept over and/or the first and second rotational positions differ by an angle of rotation of approximately 90°. However, other solutions are also possible here.

The dispensing head 3, in particular the actuator 4, preferably has at least one or two, in the illustrative example six, latching elements 27. The latching elements 27 are preferably arranged on the end of the actuator 4 facing the fastening part 5.

The latching elements 27 preferably interact with the blocking elements 24 and/or the ribs 24A thereof and/or the stops 26. In particular, the latching elements 27 serve for defining the first and/or second rotational position and/or for latching and/or fixing the actuator 4 in the first and/or second rotational position.

Preferably, two latching elements 27 are assigned to each blocking element 24.

In the first and second rotational position of the actuator 4, preferably in each case one of the ribs 24A of a blocking element 24 is arranged, in particular clamped and/or latched, between a stop 26 and a latching element 27.

Therefore, in particular an (improved) latching and/or snapping of the actuator 4 in the first and/or second rotational position is achieved by the latching elements 27, in particular in interaction with the stops 26 and/or blocking elements 24.

An actuation and/or operation of the dispensing head 3 and/or dispenser 1 takes place in particular as follows:

In the delivery state and/or before the first operation/use, the actuator 4 is preferably arranged in the first rotational position. In particular, the actuator 4 is latched in the first rotational position by means of the blocking elements 24, stops 26 and latching elements 27. Furthermore, in the delivery state and/or before the first operation/use, the display device 15 is preferably arranged in the first position.

In the first rotational position, a pressing down of the actuator 5 in the direction of the container 2 is preferably blocked, so that no dispensing of the fluid F is possible in the first rotational position.

In order to enable a fluid dispensing, the actuator 4 therefore preferably first has to be moved from the first rotational position into the second rotational position, in particular rotated about the movement axis A.

When this rotation from the first rotational position into the second rotational position is carried out for the first time, the display device 15 is preferably moved from the first position into the second position, in particular by means of the dog 16 and the stop 17.

A movement beyond the second rotational position is preferably prevented by the blocking elements 24 and stops 26, by the blocking elements 24 contacting the stops 26 on reaching the second rotational position and therefore blocking a further movement beyond the second rotational position.

Preferably, the actuator 4 is latched in the second rotational position by means of the blocking elements 24, stops 26 and latching elements 27.

In the second rotational position, a pressing down of the actuator 5 is preferably enabled, in particular by the free space 25 or the free spaces 25 being positioned above the blocking elements 24.

A fluid dispensing takes place by the actuator 4 being actuated and/or axially moved and/or pressed down in the direction of the container 2.

When the actuator 4 is pressed down, the piston 9 of the pump 7 is preferably moved and/or pressed down with the actuator 4. As a result, the pressure in the pump chamber 10 increases, which in turn leads to an (automatic) opening of the outlet valve 14, so that the fluid F located in the pump chamber 10 is pressurized by the movement of the piston 9 and flows out via the outlet 12 and is finally dispensed via an outlet channel 28 of the actuator 4.

If appropriate, the actuator 4 has to be actuated several times during the first use in order first to fill the pump chamber 10 with fluid F before a fluid dispensing takes place when the actuator 4 is pressed down.

After the dispensing of the fluid F, the user preferably releases the actuator 4. Thereupon, an automatic return of the actuator 4 preferably takes place, in particular by means of the return device 6. During the return, the actuator 4 is moved upward again, and at the same time as the actuator 4, the piston 9 is moved upward. In this case, a negative pressure arises in the pump chamber 10, by means of which the inlet valve 13 is opened and fluid F is sucked out of the container 2 via the inlet 11 into the pump chamber 10.

A further actuation of the dispensing head 3 and/or dispensing of the fluid F can then take place or the actuator 4 can be rotated again from the second rotational position back into the first rotational position, in particular in order to (temporarily) block a new and/or accidental actuation of the dispensing head 3.

Individual features and aspects of the present invention can be implemented independently of one another, but also in any desired combination.

| List of reference signs: | |
|---|---|
| 1 | Dispenser |
| 2 | Container |
| 2A | Upper edge |
| 3 | Dispensing head |
| 4 | Actuator |
| 5 | Fastening part |
| 5A | Upper edge |
| 6 | Return device |
| 7 | Pump |
| 8 | Pump housing |
| 9 | Piston |
| 10 | Pump chamber |
| 11 | Inlet |
| 12 | Outlet |
| 13 | Inlet valve |
| 14 | Outlet valve |
| 15 | Display device |
| 15A | Cylindrical portion |
| 15B | Radial portion |
| 16 | Dog |
| 17 | Stop |
| 18 | Outer wall |
| 19 | Actuation surface |
| 20 | Locking element |
| 21 | Locking element |
| 21A | Flat flank |
| 21B | Steep flank |
| 22 | Marking |
| 23 | Blocking surface |
| 24 | Blocking element |
| 25 | Free space |
| 26 | Stop |
| 27 | Latching element |
| 28 | Outlet channel |
| A | Movement axis |
| F | Fluid |

The invention claimed is:

1. A dispensing head for a dispenser configured for dispensing a fluid, wherein the dispensing head comprises:

a movable actuator configured to actuate the dispensing head or the dispenser and a fastening part configured to fasten the dispensing head to a container of the dispenser, wherein the dispensing head has a display device for indicating a first-time use of the dispensing head and is designed to automatically move the display device from a first position into a second position before or during a first-time actuation of the actuator, wherein the dispensing head has a locking mechanism which is designed to lock the display device against a return movement from the second position into the first position.

2. The dispensing head according to claim 1, wherein the actuator is rotatable and/or linearly movable.

3. The dispensing head according to claim 1, wherein the first and second position of the display device are different rotational positions of the display device and/or the display device is rotatable.

4. The dispensing head according to claim 1, wherein the actuator has a dog for moving the display device from the first position into the second position during a movement of the actuator.

5. The dispensing head according to claim 1, wherein the locking mechanism has two locking elements corresponding to one another for the locking of the display device against a return movement into the first position, preferably wherein locking display device against a return movement into the first position.

6. The dispensing head according to claim 1, wherein the display device is of annular design and/or is arranged rotatably on the fastening part.

7. The dispensing head according to claim 1, wherein the locking mechanism is arranged on an inner side of the dispensing head and/or is invisible from the outside.

8. The dispensing head according to claim 1, wherein the display device indicates a first-time use without damage, destruction or removal of a part of the dispensing head.

9. The dispensing head according to claim 5, wherein the locking elements are a gear and a pawl and/or configured for form-fitting locking of the display device against a return movement into the first position.

10. The dispensing head according to claim 5, wherein the locking elements are moved past one another during the movement of the display device from the first position into the second position.

11. The dispensing head according to claim 1, wherein the actuator is rotatable between a first rotational position and a second rotational position and the dispensing head has a blocking device for securing the actuator against an actuation in the first rotational position, wherein the actuator has a cylindrical outer wall and an actuation surface arranged thereon at an end side, wherein the blocking device is arranged radially outside the cylindrical outer wall.

12. The dispensing head according to claim 11, wherein the blocking device has a blocking element arranged on the fastening part and a blocking surface, the blocking surface being arranged on a side of the cylindrical outer wall of the actuator opposite the actuation surface and/or projecting radially outwards from the cylindrical outer wall of the actuator.

13. The dispensing head according to claim 12, wherein the blocking surface and the blocking element correspond to one another, wherein in the first rotational position of the actuator, the blocking surface and the blocking element are arranged in a same angular position, so that an actuation of the actuator is blocked by the blocking surface and the blocking element, and wherein in the second rotational position of the actuator the blocking surface is arranged outside the blocking element, so that an actuation of the actuator is released.

14. The dispensing head according to claim 5, wherein the locking elements are moved past one another during the movement of the display device from the first position into the second position.

15. A dispensing head configured for a dispenser for dispensing a fluid, the dispensing head comprising:

a movable actuator configured to actuate the dispensing head or the dispenser and a fastening part configured to fasten the dispensing head to a container of the dispenser, wherein the actuator is rotatable between a first rotational position and a second rotational position and the dispensing head has a blocking device configured to secure the actuator against an actuation in the first rotational position, wherein the actuator has a cylindrical outer wall and an actuation surface arranged thereon at an end side, wherein the blocking device is arranged radially outside the cylindrical outer wall.

16. The dispensing head according to claim 15, wherein the blocking device has a blocking surface being arranged on a side of the cylindrical outer wall of the actuator opposite the actuation surface.

17. The dispensing head according to claim 15, wherein the blocking device has a blocking surface projecting radially outwards from the cylindrical outer wall of the actuator.

18. The dispensing head according to claim 15, wherein the blocking device has a blocking element arranged on the fastening part.

19. The dispensing head according to claim 18, wherein the blocking element projects radially inwards and/or has one or more ribs.

20. The dispensing head according to claim 15, wherein the blocking device has a blocking surface and a blocking element corresponding to one another, wherein the blocking element is arranged on the fastening part, wherein in the first rotational position of the actuator the blocking surface and the blocking element are arranged in a same angular position, so that an actuation of the actuator is blocked by the blocking surface and the blocking element, and wherein in the second rotational position of the actuator the blocking surface is arranged outside the blocking element, so that an actuation of the actuator is released.

* * * * *